(12) United States Patent
Enders et al.

(10) Patent No.: US 9,352,671 B1
(45) Date of Patent: May 31, 2016

(54) VEHICLE SEAT DISPLACEMENT SYSTEMS AND RELATED METHODS AND APPARATUS

(71) Applicant: Autoliv ASP, Inc., Ogden, UT (US)

(72) Inventors: Mark L. Enders, Pleasant View, UT (US); Curt Ehle, Ogden, UT (US)

(73) Assignee: AUTOLIV ASP, INC., Ogden, UT (US)

( * ) Notice: Subject to any disclaimer, the term of this patent is extended or adjusted under 35 U.S.C. 154(b) by 0 days.

(21) Appl. No.: 14/609,277

(22) Filed: Jan. 29, 2015

(51) Int. Cl.
*B60N 2/427* (2006.01)
*B60N 2/02* (2006.01)
*B60N 2/07* (2006.01)
*B60N 2/42* (2006.01)

(52) U.S. Cl.
CPC .......... *B60N 2/42736* (2013.01); *B60N 2/0224* (2013.01); *B60N 2/0276* (2013.01); *B60N 2/0722* (2013.01); *B60N 2/4221* (2013.01)

(58) Field of Classification Search
CPC ............. B60N 2/42736; B60N 2/4221; B60N 2/0276; B60N 2/0224; B60N 2/0722
See application file for complete search history.

(56) References Cited

U.S. PATENT DOCUMENTS

| | | | | |
|---|---|---|---|---|
| 2,036,118 A * | 3/1936 | Carr | ......... | B60N 2/22 296/68 |
| 4,358,154 A | 11/1982 | Campbell | | |
| 6,092,853 A | 7/2000 | Hubbard | | |
| 6,227,563 B1 * | 5/2001 | Talisman | ............... | B60N 2/002 280/735 |
| 6,302,481 B1 | 10/2001 | Swann et al. | | |
| 6,334,643 B1 | 1/2002 | Lindblad et al. | | |
| 6,386,631 B1 * | 5/2002 | Masuda | ............... | B60N 2/4221 297/216.1 |
| 6,454,351 B2 * | 9/2002 | Motozawa | ........... | B60N 2/4221 296/68.1 |
| 8,061,770 B2 | 11/2011 | Houston et al. | | |
| 8,408,643 B2 | 4/2013 | Honnorat | | |
| 8,579,371 B2 * | 11/2013 | Masutani | ............. | B60N 2/4221 297/216.16 |
| 8,678,510 B2 * | 3/2014 | Masutani | ............ | B60R 22/1955 297/216.1 |
| 2006/0001298 A1 * | 1/2006 | Tsuruta | ................ | B60N 2/0276 297/216.16 |
| 2010/0164261 A1 * | 7/2010 | Wich | .................... | B60N 2/4279 297/216.12 |
| 2011/0133529 A1 * | 6/2011 | Guerrero | .............. | B60N 2/4221 297/216.18 |
| 2011/0210586 A1 * | 9/2011 | Masutani | ........... | B60N 2/42763 297/216.1 |

FOREIGN PATENT DOCUMENTS

DE 102013003946 9/2014
EP 1106481 11/2004

OTHER PUBLICATIONS

Concise Explanation of Relevance of DE102013003946.

* cited by examiner

*Primary Examiner* — Darlene P Condra
(74) *Attorney, Agent, or Firm* — Phillips Ryther & Winchester; Matthew D. Thayne

(57) ABSTRACT

Apparatus, methods, and systems for displacing one or more vehicle seats in a rearward direction during an impact event to increase the space between the occupant's knees/legs and an instrument panel and/or firewall, prior to the intrusion caused by the impact. In some embodiments, the system may comprise a vehicle seat and a displacement system configured to automatically displace the vehicle seat upon detecting a foot well intruding impact event within a vehicle. The displacement system may comprise a seat rail mechanism coupled with the vehicle seat and a pyrotechnic device configured to displace the vehicle seat on the seat rail mechanism upon actuation of the pyrotechnic device.

9 Claims, 7 Drawing Sheets

VEHICLE SEAT DISPLACEMENT SYSTEMS AND RELATED METHODS AND APPARATUS

SUMMARY

Apparatus, methods, and systems are disclosed herein for displacement of a vehicle seat, during or just prior to an impact event, such as an impact event that results in, or is likely to result in, intrusion into the vehicle.

There are many problems associated with a vehicle impact categorized by the Insurance Institute for Highway Safety (IIHS) as a "small overlap" (SO) crash condition. The IIHS SO test simulates an impact of the vehicle solely, or primarily, along a portion of a vehicle in front of one of the vehicle's front tires. Vehicles are typically not well suited to absorb these impacts, since they typically do not impact the longitudinal members of the vehicle structure. These impacts are therefore typically absorbed by the fender and/or front wheel where there is little or no designed vehicle structure to absorb the impact. Consequently, the vehicle's wheel, wheel well, and/or door frame often intrude into the occupant's space within the foot well of the vehicle. Such intrusions typically cause major injuries to the occupant's legs (typically left leg in the case of the driver), and, in particular, the tibia and femur.

Although some vehicle safety devices are designed for occupant leg protection, they are often less than ideal and, in some cases, may cause more harm than good in the impact scenarios referenced above.

The present inventors have therefore determined that it would be desirable to provide systems and methods that overcome one or more of the foregoing limitations and/or other limitations of the prior art. For example, the present inventors have determined that, by implementing one or more of the inventive concepts, embodiments, and/or implementations disclosed herein, leg injuries may be reduced during SO crash conditions and/or crash conditions similar to SO crash conditions (in which most or all of the impact is received on one or both sides of the front of a vehicle). These improvements may be provided by providing a system for automatically displacing one or more of the vehicle seats in a rearward direction, preferably early in the event, to increase the space between the knees/legs and the instrument panel and/or firewall, prior to the intrusion caused by the impact.

In a more particular example of a vehicle seat displacement system, the system may comprise a vehicle seat, and a displacement system configured to displace the vehicle seat upon detecting an intruding impact event within a vehicle, such as a foot well intruding impact event, for example. The displacement system may comprise a seat rail mechanism coupled with the vehicle seat and a pyrotechnic device configured to displace the vehicle seat on the seat rail mechanism upon actuation of the pyrotechnic device.

In some embodiments, the displacement system may be configured to displace the vehicle seat to a preconfigured distance from a fixed portion of the interior of the vehicle, such as a portion of the foot well of the vehicle. Alternatively, the displacement system may be configured to displace the vehicle seat by a preconfigured distance or "stroke" distance. In some embodiments, the preconfigured distance may be up to about 100 mm. In some such embodiments, the preconfigured distance may be up to about 50 mm. In some embodiments, the preconfigured distance may be between about 20 mm and about 100 mm.

Some embodiments may further comprise a sensor configured to detect an impact event within a vehicle. Some embodiments may comprise a plurality of such sensors. In some embodiments, the sensor(s) may be configured to specifically detect whether an impact event is, or is likely to be, a "foot well intruding impact event" or a "high intrusion impact event." For purposes of this disclosure, a "foot well intruding impact event" is an impact event that is sensed or otherwise determined as being either likely to result in intrusion into a foot well of a vehicle or one that has been confirmed as resulting in such intrusion. For purposes of this disclosure, the "foot well" should be considered to comprise the occupant space defined by the vehicle's firewall, instrument panel, steering wheel, floor, and/or door frame within an occupant may be at least partially positioned. For purposes of this disclosure, a "high intrusion impact event" is an impact event that is sensed or otherwise determined as being either likely to result in a high degree of intrusion into the occupant's space within a vehicle or one that has been confirmed as resulting in such intrusion. In embodiments comprising a plurality of sensors, the displacement system may be configured to determine whether an impact event is a foot well intruding impact event by comparing signals from one or more of the sensors with one or more of the other sensors.

The one or more sensors may be configured to detect an impact event directly or, alternatively, may be configured to detect or predict an impact based upon, for example, information from radar, laser, and/or camera sensors. Thus, the sensors referenced herein may comprise any combination of direct impact sensors, radar sensors, laser sensors, camera sensors, or any other such sensors used in an airbag system and/or a collision avoidance system, for example.

In some embodiments, the seat rail mechanism may comprise a first sliding mechanism. The first sliding mechanism may comprise a fixed rail configured to remain stationary relative to a vehicle and a sliding rail configured to slide relative to the fixed rail upon actuation of the pyrotechnic device.

In some embodiments, the seat rail mechanism may further comprise a second sliding mechanism coupled to the first sliding mechanism. The second sliding mechanism may be configured so as to be fixed relative to the first sliding mechanism in a first configuration, and to be disengaged from the first sliding mechanism so as to be slidable relative to the first sliding mechanism in a second configuration upon actuation of the pyrotechnic device.

The second sliding mechanism may comprise a second fixed rail configured to remain stationary relative to the first sliding mechanism in the first configuration and a second sliding rail coupled with the second fixed rail so as to be manually, selectively movable relative to the second fixed rail.

In a particular example of a vehicle according to one embodiment, the vehicle may comprise a foot well configured to receive a vehicle occupant's legs. The foot well may be defined at least in part by a firewall. The foot well may also be defined by a lower portion of the instrument panel. A seat may be positioned adjacent to the foot well and lower instrument panel. One or more sensors may be provided, each of which may be configured to detect an impact event within the vehicle. The vehicle may further comprise a displacement system configured to displace the seat in a direction away from the foot well and lower instrument panel upon receiving a signal from the sensor indicating a detection of an impact event. In some embodiments, the displacement system may be configured to displace the seat a preconfigured distance following the impact event.

In some embodiments, the displacement system may be configured to displace the seat by a distance that is independent of a velocity of the vehicle and/or with a force that is independent of a velocity of the vehicle. In other words, the displacement system may be configured specifically to move one or more vehicle occupants away from a zone of likely intrusion to avoid leg injuries, rather than to attempt to proportionally reduce the deceleration resulting from an impact.

In some embodiments, the sensor(s) may be configured to determine whether the impact event is a foot well intruding impact event and/or a high intrusion impact event. Thus, one or more sensors may be positioned at least one of in the foot well and adjacent to the firewall. In some embodiments, one or more sensors may be positioned in or near the most vehicle-forward region of the occupant's space within the vehicle. One or more additional sensors may be positioned in the front of the vehicle at particular locations, such as in front of one or both of the vehicle front wheels and/or between the wheels.

In some embodiments, the displacement system may be configured to displace the seat such that the seat is positioned the preconfigured distance from the firewall following the impact event. Alternatively, the displacement system may be configured to displace the seat by the preconfigured distance.

In a particular example of a method for displacing a vehicle seat during a vehicle impact event according to one implementation, the method may comprise detecting an impact event in a vehicle that is likely to result in intrusion into a foot well of the vehicle. Upon detecting the impact event, one or more vehicle seats may be automatically displaced in a direction away from the foot well(s). In some implementations, the vehicle seat(s) may be locked in place at a predetermined location(s) relative to the foot well following the step of automatically displacing the vehicle seat.

In some implementations, the step of displacing a vehicle seat may comprise displacing the vehicle seat with a force that is independent of a velocity of the vehicle during the impact event.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Apparatus, methods, and systems are disclosed herein for displacement of a vehicle seat, during or just prior to an impact event, such as an impact event that results in, or is likely to result in, a high degree of intrusion into the vehicle, such as into a foot well of the vehicle. The embodiments and implementations disclosed herein may thereby provide for added protection for an occupant's legs, particularly during certain impact events during which such intrusion is likely to occur.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

Figure 1A:
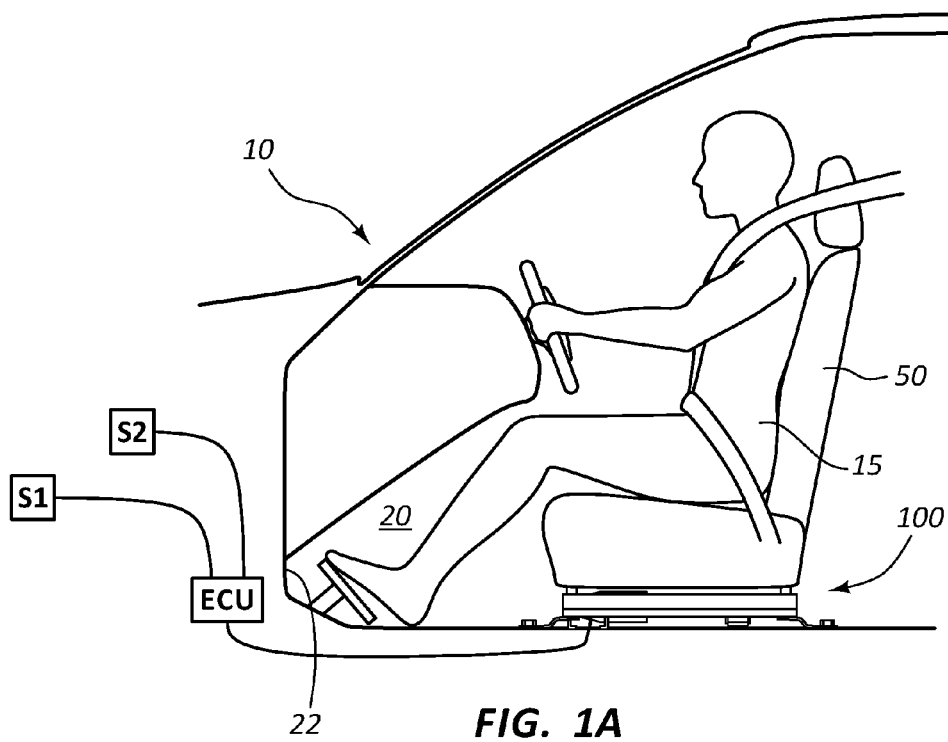
FIG. 1A depicts a vehicle including a seat displacement system according to one embodiment prior to actuation of the seat displacement system.
Figure 1B:
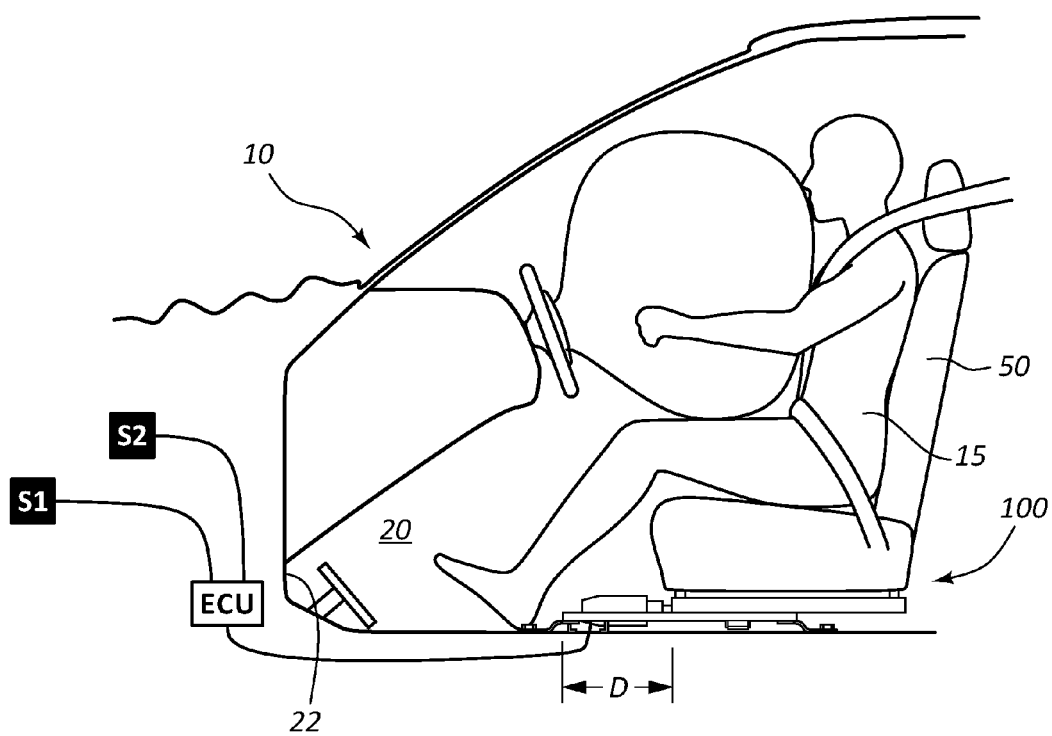
FIG. 1B depicts the vehicle of FIG. 1A following actuation of the seat displacement system.

FIGS. 1A and 1B depict a vehicle 10 including a vehicle seat displacement system 100 according to one embodiment. FIG. 1A depicts vehicle 10 prior to actuation of the seat displacement system 100 and FIG. 1B depicts vehicle 10 following actuation of the seat displacement system 100.

Vehicle 10 comprises a foot well 20. Foot well 20 is defined, at least in part, by a firewall 22 at one end and by a vehicle seat 50 at the opposite end. Firewall 22 may be configured to separate the engine (not shown) of vehicle 10 from one or more passengers, such as driver 15. The vehicle may also comprise one or more sensors, one or more of which may be part of seat displacement system 100.

For example, vehicle 10 comprises sensors S1 and S2. Sensor S1 may be positioned somewhere in the front of vehicle 10, such as in or adjacent to the bumper (not shown), for example. In some embodiments, sensor S1 may be positioned in or adjacent to a forward-most region of vehicle 10. Sensor S2 may be positioned rearward of S1 relative to vehicle 10. In some embodiments, sensor S2 may be positioned adjacent to firewall 22. In alternative embodiments, one or more sensors may be positioned in other suitable locations, such as within foot well 20.

Sensors S1 and/or S2 may be configured to detect an impact event, such as a collision with another automobile and/or a stationary object. In some embodiments, one or more of the sensors may be configured to detect, in particular, a high intrusion impact event and/or a foot well intruding impact event. A high intrusion impact event may be an impact event that is determined as being likely to result in substantial intrusion into an occupant's space within a vehicle. A foot well intruding impact event may be an impact event that is determined as being likely to result in intrusion into the foot well 20 of the vehicle 10 (such as by a wheel of the vehicle 10) and/or may be an impact event that is confirmed as resulting in such intrusion.

Sensors S1 and S2 may alternatively, or additionally, comprise one or more sensors used to sense or predict an impact before it happens, such as various sensors used in collision avoidance systems. Such sensors may comprise, for example, radar, laser, and/or camera sensors.

Thus, one or more of the sensors may be configured to determine whether an impact event is a high intrusion and/or foot well intruding impact event. In some embodiments, this may be determined by comparing the results of one or more sensors with the results of one or more other sensors. For example, if each of the sensors positioned along a front portion of a vehicle indicate detection of an impact, it may be less likely to result in intrusion into the vehicle than if only one or more sensors positioned on one particular side of the vehicle indicate detection of an impact.

With respect to the embodiment depicted in FIGS. 1A and 1B, sensor S2, because it is positioned rearward of sensor S1 relative to vehicle 10, may be used alone to determine whether an impact event is a foot well intruding impact event. Alternatively, sensor S1 (and/or other similar sensors) may be used in combination with sensor S2 to make this determination.

Upon receiving an indication from sensors S1 and/or S2 of a high intrusion and/or foot well intruding impact event, seat displacement system 100 displaces seat 50 in a rearward direction to the position illustrated in FIG. 1B. In this position, intrusion into the space occupied by driver 15, which may comprise foot well 20, is less likely to result in injuries to driver 15 and/or to at least reduce the severity of such injuries.

In some embodiments, one or more of the sensors may be coupled directly with seat displacement system 100. Alternatively, one or more of the sensors, such as sensors S1 and/or S2, may be coupled with a vehicle's electronic computer unit (ECU), as depicted in FIG. 1. In such embodiments, the ECU may be configured to receive one or more signals indicative of an impact event or likely impact event and actuate seat displacement system 100 in response.

Seat displacement system 100 may be configured to displace seat 50 a preconfigured distance following an impact event, such as a high intrusion and/or foot well intruding impact event. Seat displacement system 100 may, for example, be configured to displace seat 50 by the preconfigured distance. In other words, as shown in FIG. 1B, seat displacement system 100 may be configured to displace seat 50 by a "stroke distance" "D". In alternative embodiments, seat displacement system 100 may be configured to displace seat 50 by the preconfigured distance from firewall 22 (or any other fixed position in the vehicle 10) following the impact event, which may depend upon the position of the vehicle seat during the impact event.

In some embodiments, stroke distance D may be up to about 100 mm. In some such embodiments, stroke distance D may be up to about 50 mm. In some embodiments, stroke distance D may be between about 20 mm and about 100 mm.

Some embodiments may be configured such that the force delivered varies depending upon the initial placement of the vehicle seat. For example, the force may be increased as the vehicle seat is moved towards the front of the vehicle and may be decreased as the vehicle seat is moved towards the rear of the vehicle. Such embodiments may be particularly useful for embodiments within vehicles having rear seats. Two-seated vehicles may be configured to deliver a larger seat displacement force that need not vary due to the lack of rear passengers.

Some embodiments may also comprise a seat positioning and/or monitoring device may be incorporated into the system. In such embodiments, the displacement system may be disabled under certain conditions. For example, in vehicles having rear-seat passengers, the displacement system may be disabled if the vehicle seat is manually positioned at or near its maximally-rear position, so as to avoid intrusion to the rear occupant(s).

Various embodiments disclosed herein may be implemented in a driver's seat and/or passenger seat. Some embodiments may also comprise displacement systems in rear passenger seats. If all of the seats in a vehicle are displaced simultaneously, this may eliminate the need for worrying about intrusion of a front seat into rear passenger space.

Because many typical knee air bag systems are configured to operate under the assumption that the instrument panel has little or no intrusion, when vehicles are involved in a crash scenario that has a high level of such intrusion, the knee air bag tends to translate the intruding energy into the lower legs sooner. As such, it is contemplated that embodiments of the inventions disclosed herein may be implemented in lieu of knee air bags during these foot well intruding impact events. Thus, some embodiments may be configured to deliver an electronic signal from one or more sensors to both the seat displacement system 100, and to a separate knee air bag system. The signal to the seat displacement system 100 may result in actuation and the signal to the knee air bag system may result in disabling of the system during high intrusion and/or foot well intruding impact events.

Figure 2:
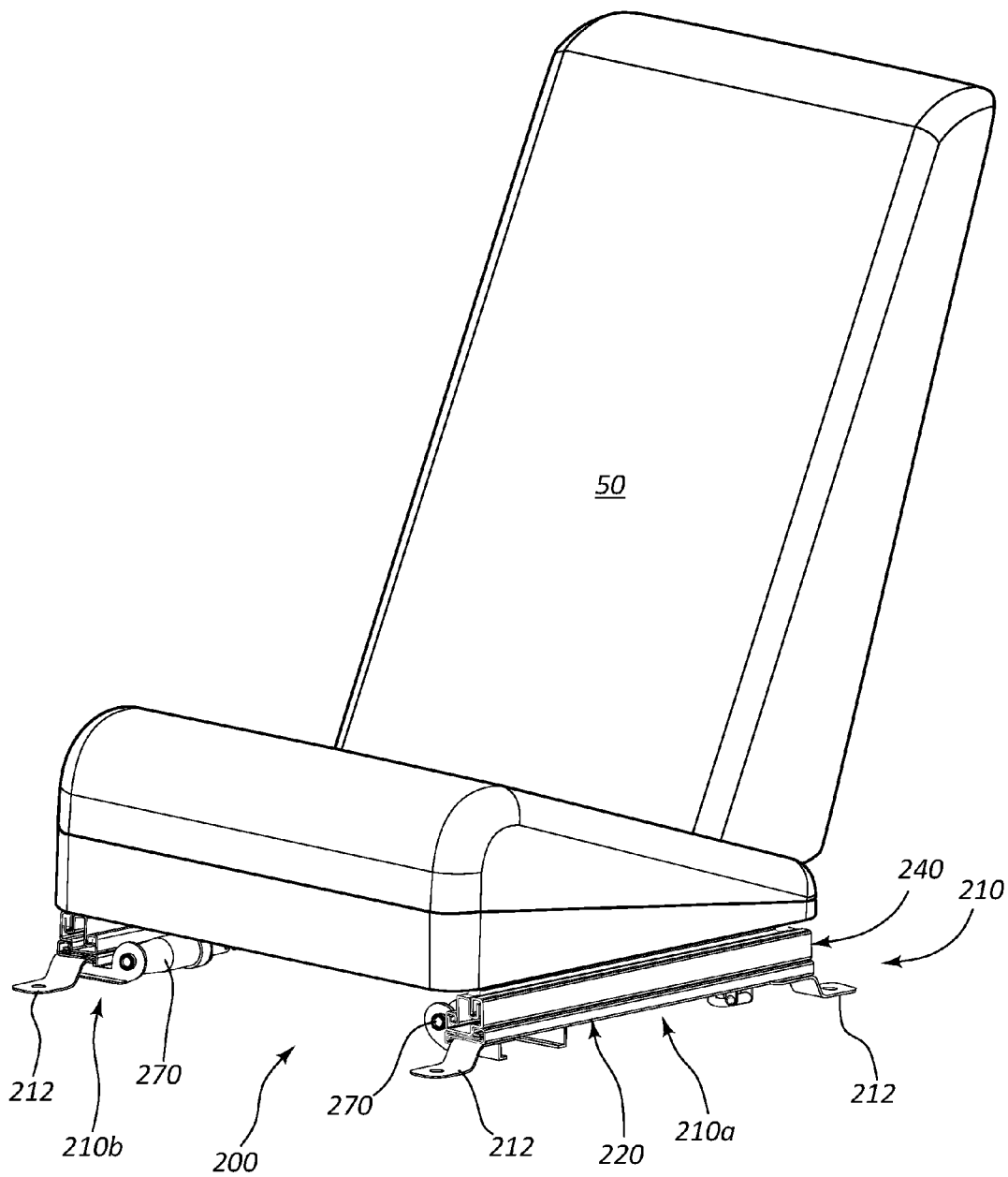
FIG. 2 is a perspective view of a vehicle seat with an embodiment of a seat displacement system.

FIG. 2 is a perspective view of a vehicle seat 50 with another embodiment of a vehicle seat displacement system 200. Vehicle seat displacement system 200 comprises a seat rail mechanism 210. Seat rail mechanism 210 may comprise two opposing seat rail mechanisms. A first seat rail mechanism 210a is positioned on a left side of vehicle seat 50 and a second seat rail mechanism 210b is positioned on a right side of vehicle seat 50. Each of the respective seat rail mechanisms may be virtually identical (other than orientation of parts). Thus, for ease of illustration and description, the various parts of the respective seat rail mechanism will be referred to with a single reference numeral. As those of ordinary skill in the art will appreciate, however, alternative embodiments may comprise fewer or greater numbers of seat rail mechanisms. For example, some embodiments may comprise a single seat rail mechanism that may be positioned centrally with respect to seat 50.

First seat rail mechanism 210a and second seat rail mechanism 210b may each comprise one or more mounting brackets 212. Mounting brackets 212 may be configured to allow the respective seat rail mechanisms to be affixed to a vehicle.

First seat rail mechanism 210a and second seat rail mechanism 210b may further each comprise two seat rail sliding mechanisms 220 and 240. Seat rail sliding mechanism 220 is coupled with seat rail sliding mechanism 240 such that seat rail sliding mechanism 220 is fixed relative to the seat rail sliding mechanism 240 in a first configuration during normal vehicle operation. Seat rail sliding mechanism 220 is further coupled with seat rail sliding mechanism 240 such that seat rail sliding mechanism 220 is disengaged from seat rail sliding mechanism 240 so as to be slidable relative to one another in a second configuration upon actuation of vehicle seat displacement system 200.

Actuation of vehicle seat displacement system 200 may be accomplished by providing an actuator, such as one or more pyrotechnic actuators 270. Thus, upon receiving a signal from a sensor indicating the presence of an impact event, which in some embodiments and implementations may comprise a foot well intruding impact event, pyrotechnic actuator(s) 270 may be actuated, which may result in displacement of vehicle seat 50 in a rearward direction to increase the space in one or more vehicle foot wells or other areas in front of a vehicle occupants legs, in order to reduce the severity and/or incidence of occupant injuries.

In some embodiments comprising pre-crash sensors, as mentioned above, other actuators may be used which may not require pyrotechnic actuation. For example, if sufficient time is provided in detecting an impact, or likely impact, by pre-crash sensors, such as, for example, cameras, radar, and/or lasers, a slower actuator may be usable. In some such embodiments, the non-pyrotechnic actuator may be reusable. For example, some embodiments may comprise an actuator 270 comprising a spring actuator or a pneumatic actuator.

Figure 3:
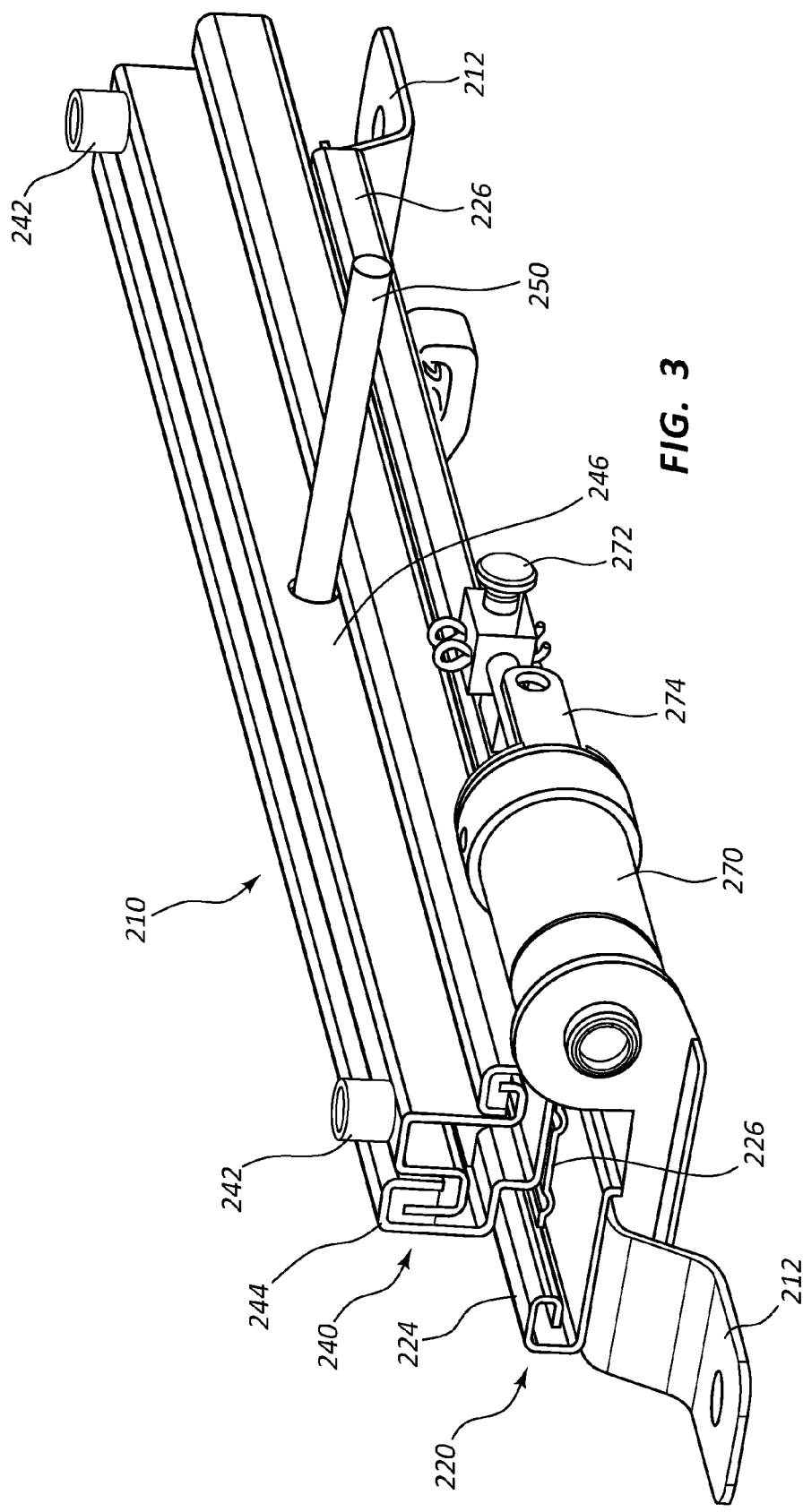
FIG. 3 depicts a partial, expanded view of the seat displacement system of FIG. 2 following actuation.

Further details regarding certain preferred embodiments can be seen in the expanded views of FIGS. 3-7. FIG. 3 depicts a partial, expanded view of seat displacement system 200. As discussed above, seat rail mechanism 210 (again, there may be two or more such mechanisms in certain embodiments) comprises two seat rail sliding mechanism, namely, seat rail sliding mechanisms 220 and 240, which are configured to slide relative to one another following actuation of seat displacement system 200. Each of the respective seat rail sliding mechanisms may comprise a respective fixed rail and sliding rail.

For example, as depicted in FIG. 3, seat rail sliding mechanism 220 comprises fixed rail 224, which may be configured to remain stationary relative to a vehicle, and a sliding rail 226, which may be configured to slide relative to fixed rail 224 upon actuation of pyrotechnic actuator 270. FIG. 3 depicts seat displacement system 200 following such actuation. Thus, fixed rail 224 is shown in a displaced position relative to sliding rail 226.

Sliding rail 226 may be fixed with seat rail sliding mechanism 240. Thus, following actuation of seat displacement system 200, seat rail sliding mechanism 240 may move along with sliding rail 226. A seat (not shown) may be coupled with seat rail sliding mechanism 240 by way of one or more seat mounts 242. As such, this seat may be displaced by the same distance as sliding rail 226 and seat rail sliding mechanism 240 during actuation.

Seat rail sliding mechanism 240 may also comprise a fixed rail and a sliding rail. More particularly, seat rail sliding mechanism 240 comprises a fixed rail 244, which may be configured to remain stationary relative to the seat rail sliding mechanism 220 in a first configuration (prior to actuation) and move (along with the rest of seat rail sliding mechanism 240) in a second configuration (following actuation).

Seat rail sliding mechanism 240 may also comprise a sliding rail 246, which may be coupled with fixed rail 244 so as to be fixed, but manually, selectively movable relative to the fixed rail 244. In other words, seat rail sliding mechanism 240 may comprise a standard mechanism by which a vehicle occupant may adjust the position of their seat prior to operating a vehicle.

These various mechanisms combined may allow for maintaining the ability to manually adjust the positioning of a vehicle seat, but also allow for displacing the seat automatically during certain impact events, such as foot well impact events, to a more desirable location for improving occupant safety. Each of the various rails and sliding mechanisms may be slidably positioned relative to one another by providing nesting and/or telescoping shapes, as shown in the drawings, that allow for such sliding during certain conditions.

Seat rail sliding mechanisms 220 and 240 may be selectively decoupled from one another upon actuation of vehicle seat displacement system 200, for example, by providing a shear pin 272 or other detachable, frangible, and/or deformable feature, configured to allow for decoupling of seat rail sliding mechanisms 220 and 240 upon actuation of a pyrotechnic actuator 270 or another actuator. Shear pin 272 may be configured to break away from a shear pin stop bracket 274 upon actuation of vehicle seat displacement system 200. In other contemplated embodiments, an exploding bolt or a power pin actuator may be used to disengage two mechanisms, such as seat rail sliding mechanisms 220 and 240, to allow for displacement of a vehicle seat. Further details regarding these features will be discussed below in connection with FIGS. 6 and 7.

A shaft 250 is also depicted in FIG. 3, which may be coupled with a motor for a rack and pinion device, as are commonly used to adjust the positioning of a vehicle seat. Such motor-driven devices may be incorporated into vehicle seat displacement system 200. Other types of powered seat mechanisms, such as a nut and worm drive, or another similar mechanism for manual adjustment of a vehicle seat position may be used if desired.

Figure 4:
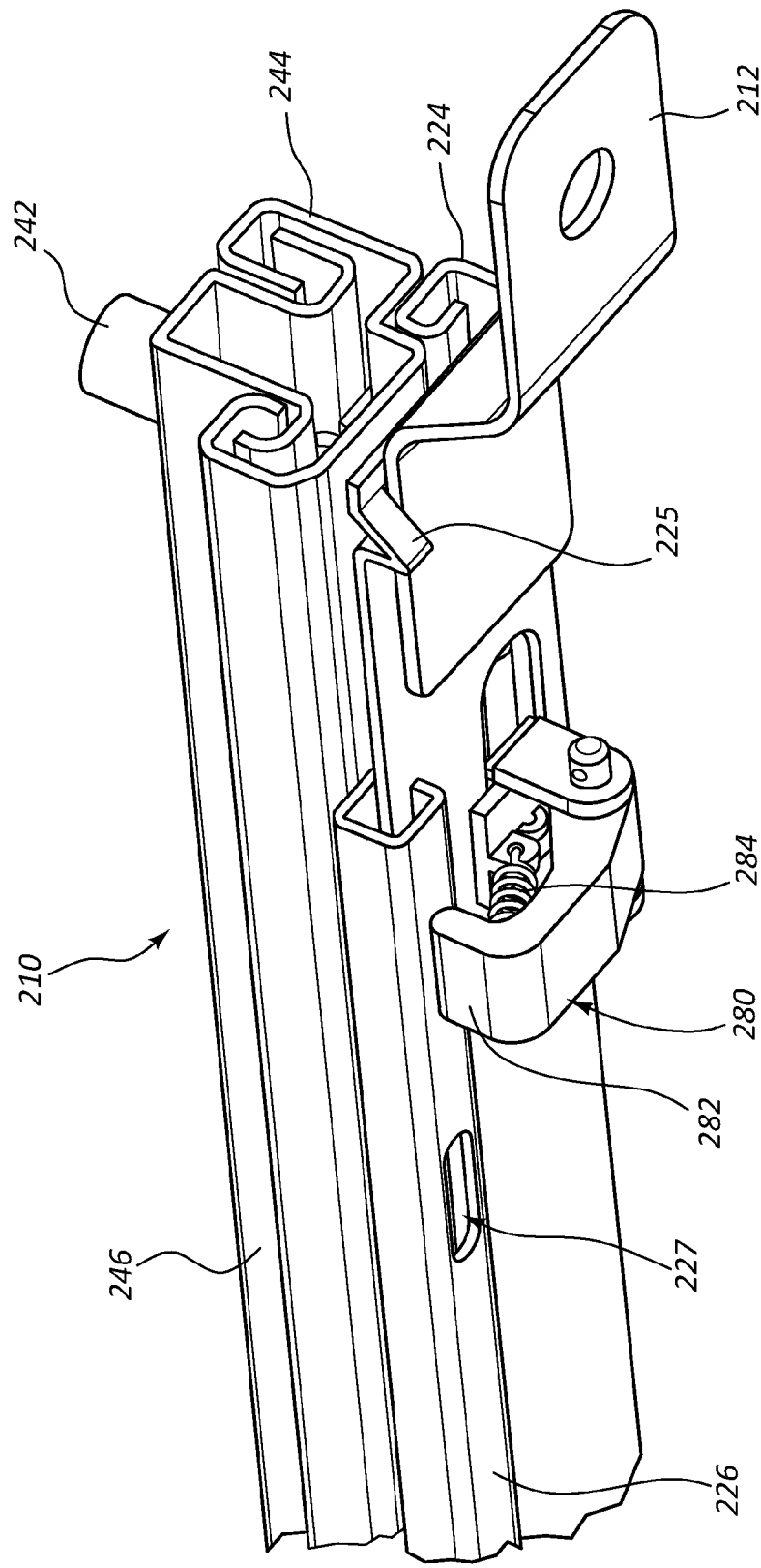
FIG. 4 depicts a partial, expanded view of a rear portion of the seat displacement system of FIGS. 2-3.
Figure 5:
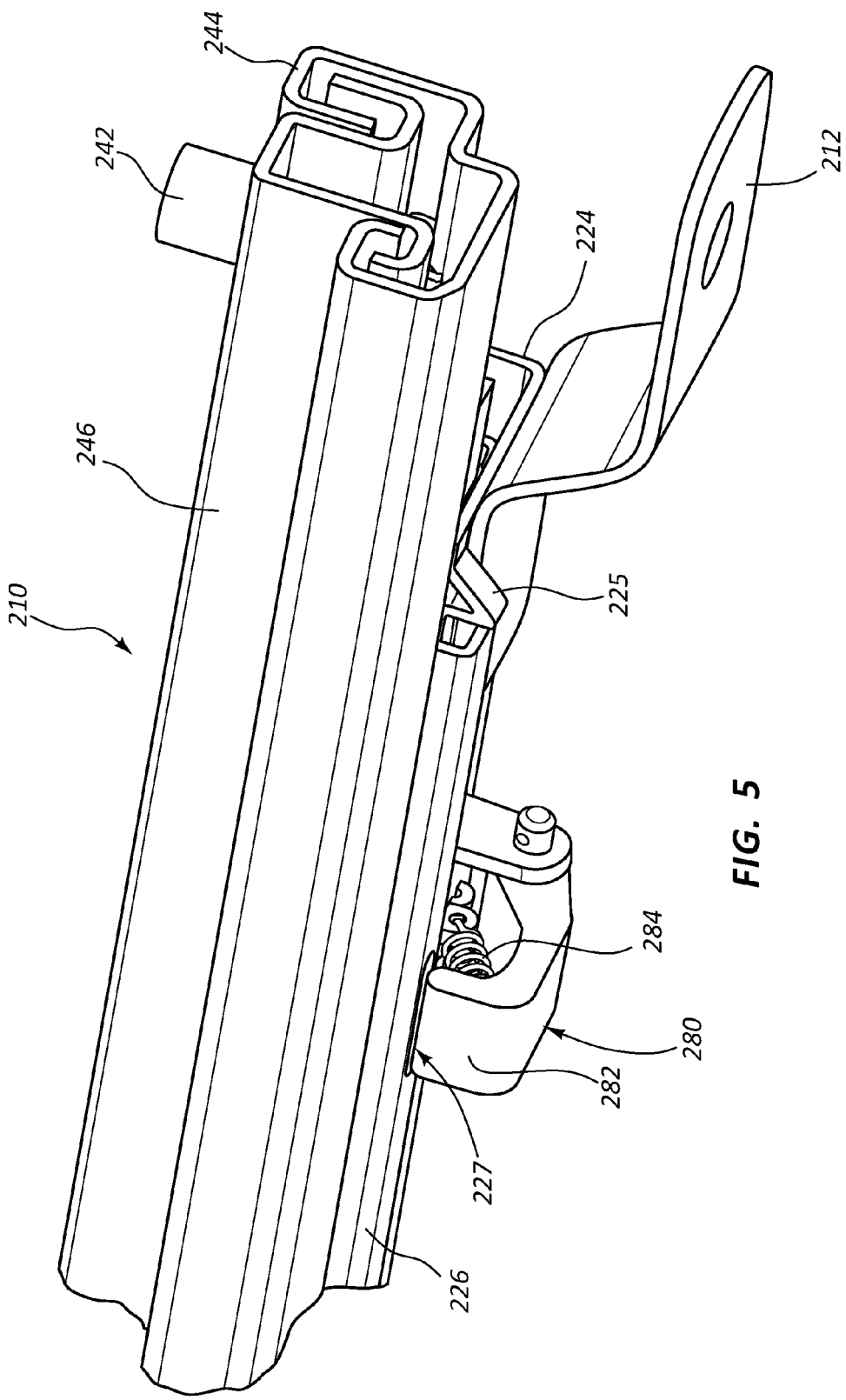
FIG. 5 depicts the seat displacement system of FIG. 4 following actuation.

FIGS. 4 and 5 depict partial, expanded views of a rear portion of seat rail mechanism 210 of vehicle seat displacement system 200. FIG. 4 depicts seat rail mechanism 210 prior to actuation and FIG. 5 depicts seat rail mechanism 210 following actuation. As illustrated in these figures, vehicle seat displacement system 200 may further comprise a locking member 280, which may be coupled to fixed rail 224 of seat rail sliding mechanism 220.

Locking member 280 may comprise a locking arm 282, which may be positioned and biased against sliding rail 226 of seat rail sliding mechanism 220. In the depicted embodiments, a spring 284 is used to bias locking arm 282. However, any other means for biasing may be used in alternative embodiments. In other embodiments, a locking arm or other similar component may be biased against sliding rail 226 by using a flexible material and coupling the material to the fixed rail 224, or another component of the system, in a suitable manner to result in such biasing.

After deployment of vehicle seat displacement system 200, locking arm 282 engages with an opening 227 formed within sliding rail 226 so that the stroke distance of the system may be controlled, as depicted in FIG. 5. This may also serve a safety function by preventing the vehicle seat from being displaced too far and injuring vehicle occupants behind the seat.

In some embodiments, a plurality of such openings, or other similar stop features, may be provided. By selectively closing and opening desired openings within such a plurality of openings, the system may be designed to allow for fine-tuning the desired stroke distance.

One or more additional safety features may be included if desired. For example, an emergency stop 225 may be coupled with or formed in fixed rail 224. Emergency stop may be used to ensure that the vehicle seat does not become separated or derailed from vehicle seat displacement system 200. In the depicted embodiment, emergency stop 225 comprises a protruding member extending from the end of one side of fixed rail 224. However, other embodiments are contemplated in which emergency stop may comprise, for example, a bumper, cushion, tab, or even simply a portion of fixed rail 224 having a thicker dimension so as to inhibit or prohibit further sliding. Other contemplated embodiments may employ more complicated braking/stop features/mechanisms, such as a powered sliding pin or a brake mechanism of some sort. In some embodiments, emergency stop 225 may be spaced apart from a peripheral edge of sliding rail 226 at least approximately the same distance with which opening 227 is spaced from this peripheral edge (in the opposite direction). This distance may correspond with a desired stroke distance with which the seat is displaced upon actuation.

Figure 6:
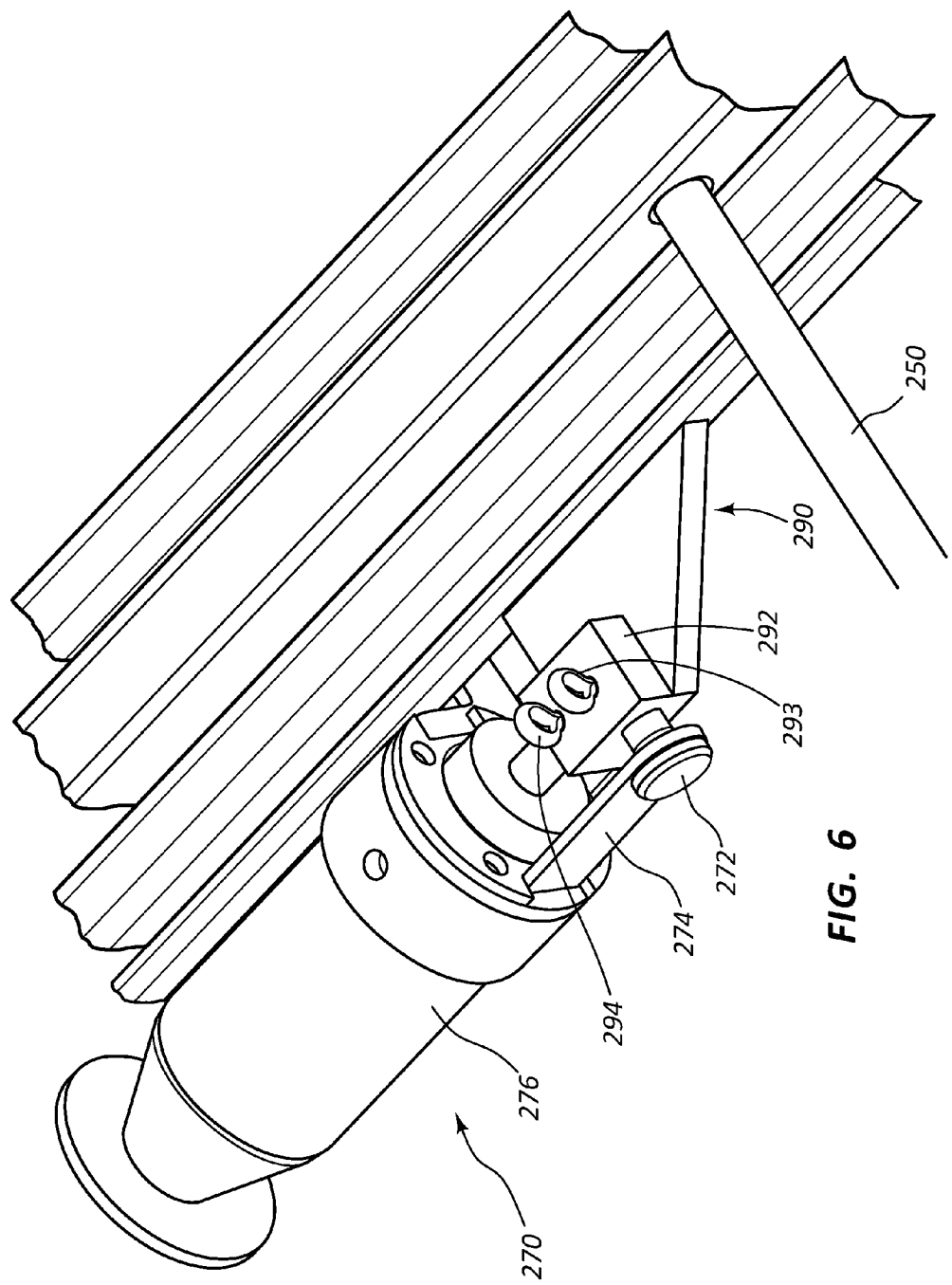
FIG. 6 is an expanded view of an actuation subsystem of an embodiment of a vehicle seat displacement system.
Figure 7:
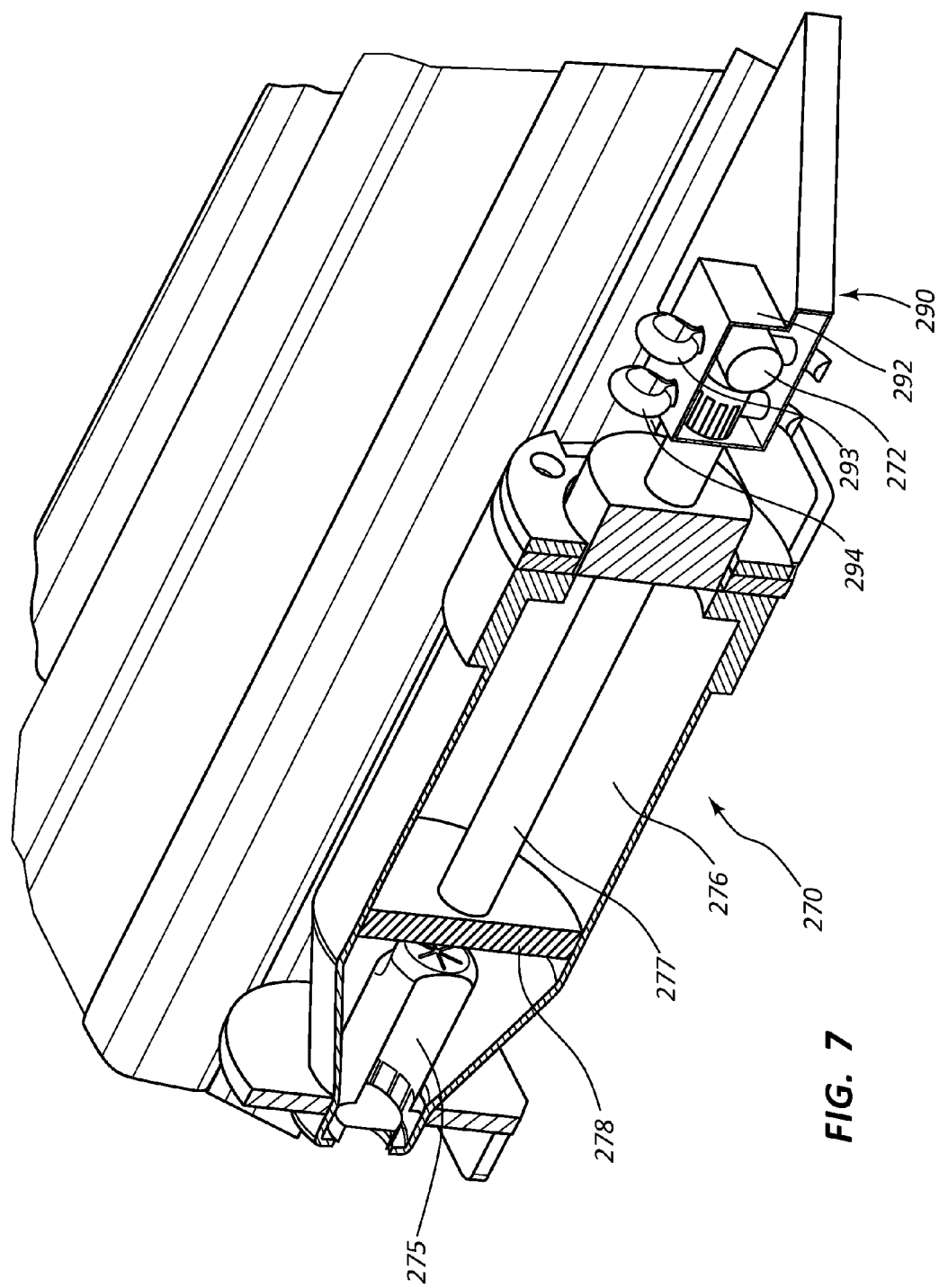
FIG. 7 is a cross-sectional view of the actuation subsystem depicted in FIG. 6.

FIG. 6 is an expanded view of an actuation subsystem of vehicle seat displacement system 200. FIG. 7 is a cross-sectional view of an actuator 270 of this subsystem. As previously mentioned, an actuator comprising a pyrotechnic actuator 270 may be used in certain embodiments. Pyrotechnic actuator 270 may comprise a pneumatic air cylinder 276 with a push rod 277 and a piston 278.

A pyrotechnic generator 275 may be used to actuate the device. In some embodiments, pyrotechnic generator 275 may comprise a micro gas generator (MGG). In certain preferred embodiments, pyrotechnic generator 275 may comprise about 1 gram of pyrotechnic material and/or sufficient material to generate a force of about 500 N to push the seat rearward. For example, it has been determined through simulation that a force of about 500 N per rail is required to push the typical seat of a weight of 165 N (37 lbs) and a 50th percentile occupant at 733 N (165 lbs) back about 50 mm. Of course, a wide variety of alternatives are possible, depending upon how many pyrotechnic generators 275 are used, how large the vehicle seat is and/or the expected seat occupants, how long the desired displacement stroke is, what type of materials and components are used, what type of vehicle is used (2-passenger vs. rear seated vehicles, e.g.), etc.

Push rod 277 may be coupled with a coupling member 290, which may comprise a bracket. In alternative embodiments, coupling member 290 may comprise a rod, projection, or other similar component configured to couple push rod 277 with a moving component of the system, such as sliding rail 226. Coupling member 290 may comprise a chamber 292 configured to receive push rod 277 and shear pin 272. Locking pins 293 and 294 may be used to secure shear pin 272 and push rod 277, respectively, within chamber 292.

As previously mentioned, a shear pin stop bracket 274 may extend from a fixed portion of actuator 270. Once shear pin 272 has been positioned to extend through shear pin stop bracket 274, locking pin 293 may be positioned into chamber 292 and through shear pin 272. Then, upon receipt of an electronic signal from one or more sensors, the pyrotechnic material within the pyrotechnic generator 275 may be ignited. This ignition results in compression of piston 278, which forces push rod 277 in a direction towards a rear of a corresponding vehicle seat. This force preferably also provides sufficient force to break shear pin 272, which may otherwise hold the vehicle seat stationary until an impact event is sensed. The force generated from this ignition, after shear pin 272 has been broken, also causes the vehicle seat to move away from a foot well of the vehicle. In the depicted embodiment, this force occurs by way of transferring force from push rod 277 to sliding rail 226 through coupling bracket 290.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present invention should, therefore, be determined only by the following claims.

The invention claimed is:

1. A vehicle seat displacement system, comprising:
a vehicle seat; and
a displacement system configured to displace the vehicle seat upon detecting a foot well intruding impact event within a vehicle, the displacement system comprising:
a seat rail mechanism coupled with the vehicle seat; and
an actuator configured to displace the vehicle seat on the seat rail mechanism upon actuation of the actuator, wherein the seat rail mechanism comprises a first sliding mechanism comprising:
a fixed rail configured to remain stationary relative to a vehicle; and
a sliding rail configured to slide relative to the fixed rail upon actuation of the actuator, wherein the seat rail mechanism further comprises a second sliding mechanism coupled to the first sliding mechanism, wherein the second sliding mechanism is configured so as to be fixed relative to the first sliding mechanism in a first configuration, wherein the second sliding mechanism is configured so as to be disengaged from the first sliding mechanism so as to be slidable relative to the first sliding mechanism in a second configuration upon actuation of the actuator.

2. The system of claim 1, wherein the actuator comprises a pyrotechnic device configured to displace the vehicle seat on the seat rail mechanism upon actuation of the pyrotechnic device.

3. The system of claim 1, wherein the displacement system is configured to displace the vehicle seat to a preconfigured distance from a distal portion of the foot well.

4. The system of claim 1, wherein the displacement system is configured to displace the vehicle seat by a preconfigured distance.

5. The system of claim 4, wherein the preconfigured distance is no greater than about 100 mm.

6. The system of claim 1, wherein the displacement system further comprises a sensor configured to detect an impact event within a vehicle.

7. The system of claim 6, wherein the displacement system further comprises a second sensor configured to detect an impact event within the vehicle.

8. The system of claim 7, wherein the displacement system is configured to determine whether an impact event is a foot well intruding impact event by comparing signals from the sensor and the second sensor.

9. The system of claim 1, wherein the second sliding mechanism comprises:
a second fixed rail configured to remain stationary relative to the first sliding mechanism in the first configuration; and a second sliding rail coupled with the second fixed rail so as to be manually, selectively movable relative to the second fixed rail.

\* \* \* \* \*